US012445632B2

(12) United States Patent
Trojanowski

(10) Patent No.: US 12,445,632 B2
(45) Date of Patent: Oct. 14, 2025

(54) IMAGE COMPRESSION WITH INTER-CHANNEL ENCODING OF CODEWORDS

(71) Applicant: Synaptics Incorporated, San Jose, CA (US)

(72) Inventor: Karol Trojanowski, Bielsko-Biała (PL)

(73) Assignee: Synaptics Incorporated, San Jose, CA (US)

( * ) Notice: Subject to any disclaimer, the term of this patent is extended or adjusted under 35 U.S.C. 154(b) by 182 days.

(21) Appl. No.: 17/721,966

(22) Filed: Apr. 15, 2022

(65) Prior Publication Data

US 2023/0336752 A1    Oct. 19, 2023

(51) Int. Cl.
| | | |
|---|---|---|
| *H04N 19/169* | (2014.01) | |
| *H04N 19/12* | (2014.01) | |
| *H04N 19/124* | (2014.01) | |
| *H04N 19/176* | (2014.01) | |
| *H04N 19/18* | (2014.01) | |
| *H04N 19/182* | (2014.01) | |
| *H04N 19/186* | (2014.01) | |
| *H04N 19/60* | (2014.01) | |

(52) U.S. Cl.
CPC ......... *H04N 19/1887* (2014.11); *H04N 19/12* (2014.11); *H04N 19/124* (2014.11); *H04N 19/176* (2014.11); *H04N 19/18* (2014.11); *H04N 19/182* (2014.11); *H04N 19/186* (2014.11); *H04N 19/60* (2014.11)

(58) Field of Classification Search
CPC .. H04N 19/176; H04N 19/124; H04N 19/186; H04N 19/70; H04N 19/46; H04N 19/136; H04N 19/44; H04N 19/117; H04N 19/132; H04N 19/122; H04N 19/14; H04N 19/625; H04N 19/91; H04N 19/60
See application file for complete search history.

(56) References Cited

U.S. PATENT DOCUMENTS

2010/0312811 A1* 12/2010 Reznik .................. H04N 19/42
                                                            708/402

* cited by examiner

*Primary Examiner* — Farhan Mahmud
(74) *Attorney, Agent, or Firm* — Paradice & Li LLP

(57) ABSTRACT

This disclosure provides methods, devices, and systems for image compression. The present implementations more specifically relate to image compression techniques that support inter-channel encoding of codewords. An encoder implementing an image compression operation may apply a spatial-frequency transform to a number (N) arrays of pixel values associated with N color channels, respectively, and may quantize the result to produce N arrays of quantized coefficients. In some aspects, the encoder may map each quantized coefficient of the N arrays of quantized coefficients to a data structure and may encode the data structure as one or more codewords associated with a lossless compression scheme. In some implementations, the mapping may arrange the quantized coefficients in the data structure in order of decreasing (or increasing) amplitude, independent of color channel.

20 Claims, 10 Drawing Sheets

IMAGE COMPRESSION WITH INTER-CHANNEL ENCODING OF CODEWORDS

TECHNICAL FIELD

The present implementations relate generally to data compression, and specifically to image compression with inter-channel encoding of codewords.

BACKGROUND OF RELATED ART

A digital image can be represented by a number (N) of arrays of pixel values associated with N color channels, respectively. For example, digital images are often captured (or rendered) in the "RGB" color space, which includes red (R), green (G), and blue (B) channels. However, digital images are often stored (or processed) in the "YCbCr" color space, which includes luma (Y), blue-difference chroma (Cb), and red-difference chroma (Cr) channels. Image compression can reduce the size of a digital image, for example, by applying a spatial-frequency transform to the N arrays of pixel values and quantizing the resulting transform coefficients to produce N arrays of quantized coefficients, respectively. The quantized coefficients can be compressed to further reduce the amount of data required for storage or transmission.

Data compression is a technique for encoding information into smaller units of data. As such, data compression can be used to reduce the bandwidth or overhead needed to store or transmit such information over a communications channel. For example, an encoder encodes or compresses the information into a sequence of coded bits (also referred to as a "codeword") and a decoder subsequently decodes or decompresses the codeword to recover the original information. Data compression techniques can be generally categorized as "lossy" or "lossless." Lossy data compression may result in some loss of information between the encoding and decoding of such information. In contrast, no information is lost as a result of encoding or decoding such information using lossless data compression.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of image compression performed by an encoder. The method includes steps of receiving a block of pixel data associated with an image, the block of pixel data including a plurality of arrays of pixel values associated with a plurality of color channels, respectively; transforming the plurality of arrays of pixel values to a plurality of arrays of transform coefficients, respectively, based on a spatial-frequency transform; quantizing the plurality of arrays of transform coefficients as a plurality of arrays of quantized coefficients, respectively, based on a quantization codebook; mapping each quantized coefficient of the plurality of arrays of quantized coefficients to a data structure based on mapping information associated with one or more representative images; and encoding the data structure as one or more codewords associated with a lossless compression scheme.

Another innovative aspect of the subject matter of this disclosure can be implemented in an encoder that includes a processing system and a memory. The memory stores instructions that, when executed by the processing system, cause the encoder to receive a block of pixel data associated with an image, the block of pixel data including a plurality of arrays of pixel values associated with a plurality of color channels, respectively; transform the plurality of arrays of pixel values to a plurality of arrays of transform coefficients, respectively, based on a spatial-frequency transform; quantize the plurality of arrays of transform coefficients as a plurality of arrays of quantized coefficients, respectively, based on a quantization codebook; map each quantized coefficient of the plurality of arrays of quantized coefficients to a data structure based on mapping information associated with one or more representative images; and encode the data structure as one or more codewords associated with a lossless compression scheme.

Another innovative aspect of the subject matter of this disclosure can be implemented in a method of image decompression performed by a decoder. The method includes steps of receiving mapping information and one or more codewords associated with an image; decoding the one or more codewords as a data structure based on a lossless compression scheme; demapping, from the data structure, a plurality of arrays of quantized coefficients associated with a plurality of color channels, respectively, based on the received mapping information; dequantizing the plurality of arrays of quantized coefficients as a plurality of arrays of transform coefficients, respectively, based on a quantization codebook; and recovering a plurality of arrays of pixel values from the plurality of arrays of transform coefficients, respectively, based on an inverse spatial-frequency transform, the plurality of arrays of pixel values representing at least a portion of the image.

BRIEF DESCRIPTION OF THE DRAWINGS

The present implementations are illustrated by way of example and are not intended to be limited by the figures of the accompanying drawings.

FIG. 4A shows an example block of image data associated with a number of color channels.

FIG. 4B shows an example mapping of the block of image data depicted in FIG. 4A to a data structure, according to some implementations.

DETAILED DESCRIPTION

Figure 1:
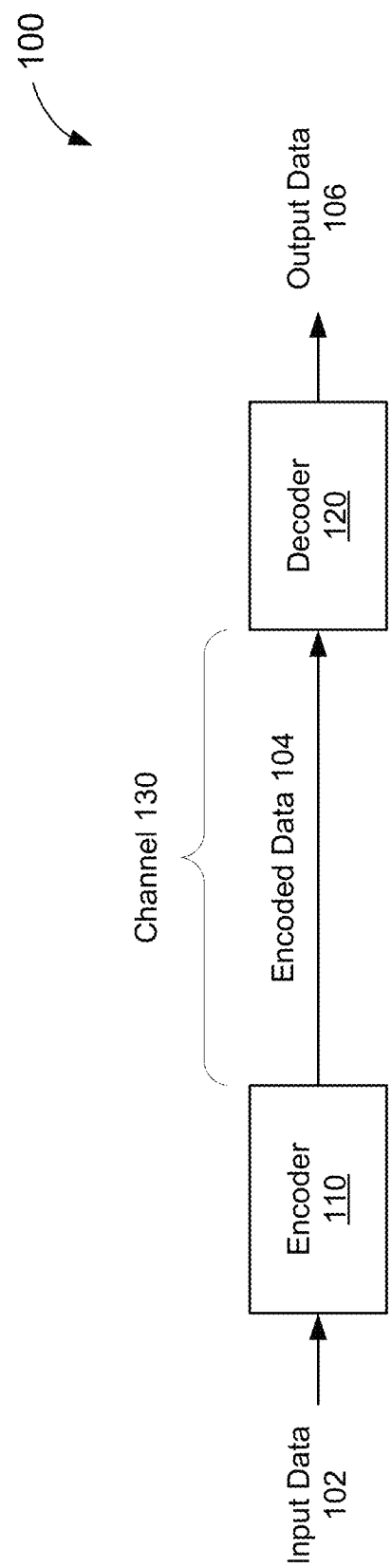
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, in some image compression techniques, a spatial-frequency transform (such as a discrete cosine transform (DCT) or a wavelet transform) is applied to blocks of raw pixel values and the resulting transform coefficients is quantized prior to encoding. Quantization may result in some loss of information. However, the quantized values can be encoded using lossless compression techniques to mitigate the loss of information associated with image compression. Example lossless compression techniques may include, among other examples, entropy encoding and run-length encoding (RLE). In entropy encoding, data values are encoded into codewords of varying lengths based on the probability of occurrence of each data value. In RLE, runs of data having the same value (such as a sequence of consecutive zeroes) are represented by encoded values that describe the lengths of each run.

A compressed digital image can be represented by multiple arrays of quantized coefficients, where each array is associated with a respective color channel. More specifically, compressed digital images are often stored (and processed) in the "YCbCr" color space, which includes luma (Y), blue-difference chroma (Cb), and red-difference chroma (Cr) channels. Existing image compression techniques encode each of the arrays of quantized coefficients separately. As a result, the encoding operation produces a respective set of codewords for each of the color channels (such as the Y, Cb, and Cr channels). However, aspects of the present disclosure recognize that, by encoding each color channel separately, existing image compression techniques may fail to exploit some redundancies that can occur across the different color channels.

Various aspects relate generally to image compression, and more particularly, to image compression techniques that support inter-channel encoding of codewords. As described above, an encoder implementing an image compression operation may apply a spatial-frequency transform to N arrays of pixel values associated with N color channels, respectively, and may quantize the result to produce N arrays of quantized coefficients. In some aspects, the encoder may map each quantized coefficient of the N arrays of quantized coefficients to a data structure and may encode the data structure as one or more codewords associated with a lossless compression scheme. In some implementations, the mapping may arrange the quantized coefficients in the data structure in order of decreasing (or increasing) amplitude, independent of color channel. Thus, the quantized coefficient having the highest amplitude among all quantized coefficients in the N arrays of quantized coefficients may be mapped to the beginning of the data structure and the quantized coefficient having the lowest amplitude among all quantized coefficients in the N arrays of quantized coefficients may be mapped to the end of the data structure.

Particular implementations of the subject matter described in this disclosure can be implemented to realize one or more of the following potential advantages. By pooling all of the quantized coefficients from the N arrays of quantized coefficients in a single data structure and encoding the data structure as one or more codewords in accordance with a lossless compression scheme (rather than encoding each of the N arrays separately), aspects of the present disclosure may significantly improve the efficiency of image compression. For example, the inter-channel mapping of quantized coefficients to the same data structure allows longer runs of zeroes (or other quantized values) to be grouped together and encoded or compressed using existing lossless data encoding techniques (such as variable length coding, arithmetic coding, RLE, or other entropy coding techniques). As a result, image compression with inter-channel encoding of codewords may reduce the size of compressed images without incurring any further loss of information compared to existing image compression techniques.

FIG. 1 shows an example communication system 100 for encoding and decoding data. The communication system 100 includes an encoder 110 and a decoder 120. In some implementations, the encoder 110 and decoder 120 may be provided in respective communication devices such as, for example, computers, switches, routers, hubs, gateways, cameras, displays, or other devices capable of transmitting or receiving communication signals. In some other implementations, the encoder 110 and decoder 120 may be included in the same device or system.

The encoder 110 receives input data 102 to be transmitted or stored via a channel 130. For example, the channel 130 may include a wired or wireless transmission medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104 via the channel 130 and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As such, the output data 106 may be different than the input data 102. In contrast, lossless data compression does not result in any loss of information between the encoding and decoding steps as long as the channel 130 does not introduce errors into the encoded data 104. As such, the output data 106 is identical to the input data 102. Example lossless compression techniques may include, among other examples, entropy encoding and run-length encoding (RLE). In entropy coding, data values are encoded into sequences of bits based on actual or modeled probabilities of the data values. In RLE, long "runs" of data having the same value (such as a sequence of consecutive zeroes) are represented by encoded values that describe the lengths of each run.

Figure 2:
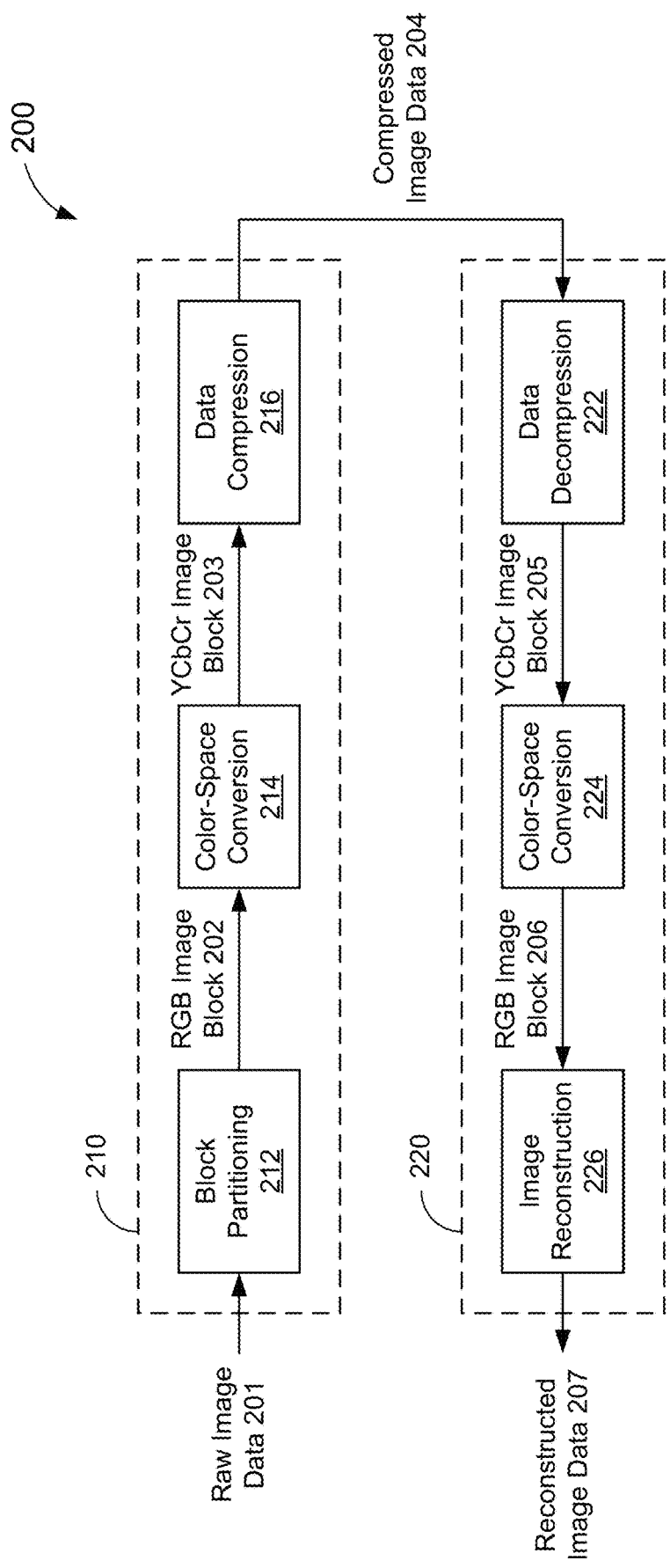
FIG. 2 shows a block diagram of a digital image transmission system, according to some implementations.

FIG. 2 shows a block diagram of a digital image transmission system 200, according to some implementations. The system 200 includes an image encoder 210 and an image decoder 220. In some implementations, the image encoder 210 and the image decoder 220 may be examples of the encoder 110 and decoder 120, respectively, of FIG. 1. Thus, the image encoder 210 may be communicatively coupled to the image decoder 220 via a channel (such as the channel 130 of FIG. 1).

The image encoder 210 is configured to encode raw image data 201, as compressed image data 204, for transmission (or storage) via the channel. In some implementations, a frame of raw image data 201 may include multiple arrays of pixel values representing a digital image captured or acquired by an image source (such as a camera or other image output device). For example, each of the arrays of pixel values may be associated with a respective color channel in the RGB color space. As such, each pixel value in a given array indicates an intensity or brightness of a component color (such as red, green or blue) at a respective pixel in the digital image. The image decoder 220 is configured to decode the compressed image data 204, as reconstructed image data 207, for display on a display device (such as a television, computer monitor, smartphone, or any other device that includes an electronic display). More specifically, the image decoder 220 is configured to reverse the encoding performed by the image encoder 210 so that the reconstructed image data 207 is substantially similar to the raw image data 201.

In some implementations, the image encoder 210 may include a block partitioning component 212, a color-space conversion component 214, and a data compression component 216. The block partitioning component 212 partitions or subdivides each frame of raw image data 201 into a number of image blocks 202 in the RGB color space (also referred to as an "RGB" image block). Each RGB image block 202 includes a subset of the pixel values, from each of the red (R), green (G), and blue (B) channels, representing a respective portion the digital image. The color-space conversion component 214 converts each RGB image block 202 to a respective YCbCr image block 203. More specifically, the color-space conversion component 214 changes the color space of each RGB image block 202 from the RGB color space to the YCbCr color space. As a result, each YCbCr image block 203 may include multiple arrays of pixel values, where each of the arrays is associated with a respective one of the luma (Y), blue-difference chroma (Cb), and red-difference chroma (Cr) channels.

The data compression component 216 is configured to compress each YCbCr image block 203 to reduce the size of data transmissions from the image encoder 210 to the image decoder 220. For example, the data compression component 216 may encode each YCbCr image block 203 as a respective frame (or subframe) of compressed image data 204. Each frame of compressed image data 204 may include one or more codewords that are encoded in accordance with a known encoding scheme (such as variable length coding, arithmetic coding, RLE, or other entropy coding techniques). In existing image compression techniques, the Y, Cb, and Cr channels are encoded separately so that each frame of compressed image data 204 includes one or more codewords associated with each of the color channels. However, aspects of the present disclosure recognize that the Cb and Cr channels often carry significantly less information than the Y channel, and thus by encoding each of the color channels separately, existing image compression techniques may fail to exploit some cross-channel statistical properties (such as redundancy) that are highly conducive to compression.

In some aspects, the data compression component 216 may perform an inter-channel encoding of the YCbCr image block 203. In contrast with existing image processing techniques, the inter-channel encoding may pool information from multiple color channels to produce codewords that are not associated with any particular color channel. In some implementations, the data compression component 216 may map information from each of the Y, Cb, and Cr channels to a data structure prior to encoding. The mapping may arrange the information in the data structure according to a statistical distribution that is optimized for compression in accordance with one or more encoding techniques (such as RLE). For example, data values that are the same or similar in amplitude (or absolute magnitude) may be grouped together in the data structure, regardless of color channel boundaries, so that the data can be encoded into the fewest possible codewords (such as using RLE). As a result, some codewords may carry encoded information for multiple color channels.

In some implementations, the image decoder 220 may include a data decompression component 222, a color-space conversion component 224, and an image reconstruction component 226. The data decompression component 222 is configured to decode each frame of compressed image data 204 as a decompressed YCbCr image block 205. More specifically, the data decompression component 222 may reverse the compression performed by the data compression component 216. For example, the data decompression component 216 may decode the codewords associated with a frame of compressed image data 204 to recover a data structure that includes information associated with each of the Y, Cb, and Cr channels. In some implementations, the data decompression component 216 may organize the information in the data structure according to color channel so that a respective array of pixel values can be reconstructed for each of the Y, Cb, and Cr channels in the decompressed YCbCr image block 205 (similar to the YCbCr image block 203).

The color-space conversion component 224 converts each decompressed YCbCr image block 205 to a respective decompressed RGB image block 206. More specifically, the color-space conversion component 224 reverses the color-space conversion performed by the color-space conversion component 214, for example, by changing the color space of the decompressed YCbCr image block 205 from the YCbCr color space to the RGB color space. As a result, each decompressed RGB image block 206 may include multiple arrays of pixel values, where each of the arrays is associated with a respective one of the R, G, or B channels (similar to the RGB image block 202). The image reconstruction component 226 aggregates the decompressed RGB image blocks 206 as reconstructed image data 206. More specifically, the image reconstruction component 226 may reverse the partitioning performed by the block partitioning component 212, for example, by reassembling the decompressed RGB image blocks 206 into a frame of reconstructed image data 207 representing a digital image (similar to the frame of raw image data 201).

Figure 3:
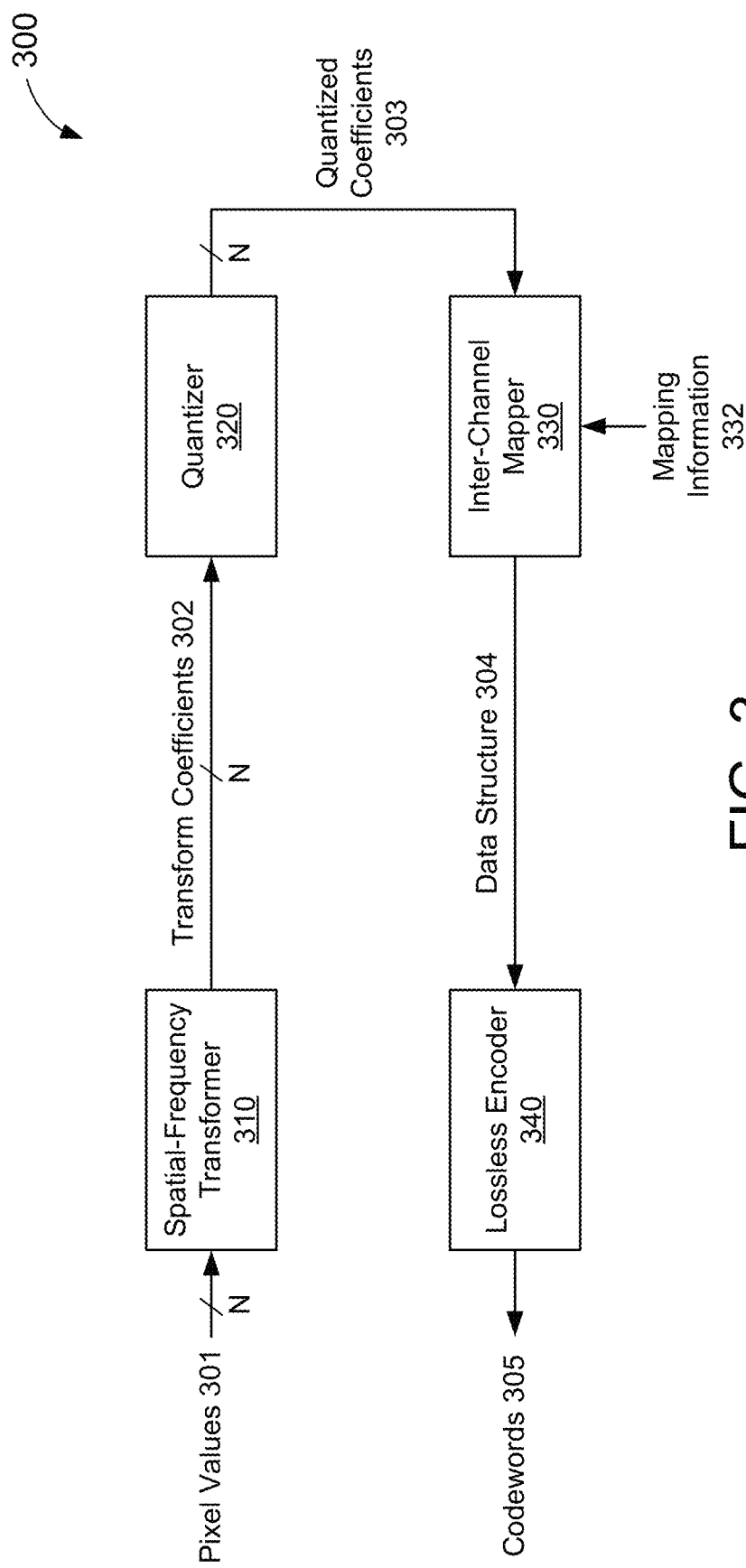
FIG. 3 shows a block diagram of an image compression system, according to some implementations.

FIG. 3 shows a block diagram of an image compression system 300, according to some implementations. In some implementations, the image compression system 300 may be one example of the data compression component 216 of FIG. 2. Accordingly, the image compression system 300 may be configured to encode a number (N) of arrays of pixel values 301 as a series of codewords 305. In some aspects, the N arrays of pixel values 301 may represent a block of image data (such as the YCbCr image block 203 of FIG. 2). Thus, each of the N arrays of pixel values 301 may be associated with a respective color channel (such as one of the Y, Cb, or Cr channels associated with the YCbCr color space).

The image compression system 300 includes a spatial-frequency transformer 310, a quantizer 320, an inter-channel mapper 330, and a lossless encoder 340. The spatial-frequency transformer 310 transforms the N arrays of pixel values 301 to N arrays of transform coefficients 302, respectively. More specifically, the spatial-frequency transformer 310 may apply a spatial-frequency transform (such as a transform matrix) to each of the N arrays of pixel values 301 to convert the pixel values 301 from the spatial domain to the frequency domain. Example suitable spatial-frequency transforms include DCTs and wavelet transforms, among other examples. As a result of the spatial-frequency transformation, each of the transform coefficients 302 in a given array is associated with a respective spectral sub-band. For example, in an 8×8 array, the lowest transform coefficient (in the top-left corner of the array) indicates an amplitude or contribution of the lowest-frequency sub-band and the highest transform coefficient (in the bottom-right corner of the array) indicates an amplitude or contribution of the highest-frequency sub-band.

The quantizer 320 quantizes the N arrays of transform coefficients 302, in accordance with one or more quantization techniques, as N arrays of quantized coefficients 303. Example suitable quantization techniques may include, among other examples, quantization matrices, vector quantization, or deadzone quantization. For example, the quantizer 320 may apply a set of quantization values (such as from a quantization codebook) to each of the N arrays of transform coefficients 302 to reduce the amount of data associated with higher-frequency sub-bands. Because human visual perception is more sensitive to lower-frequency patterns than to higher-frequency patterns, the step of quantization can remove some of the higher-frequency information without substantially degrading the quality of the image perceived by a user. As a result, quantized coefficients 303 associated with higher-frequency sub-bands (such as in the lower-right portion of each array) may have amplitudes equal (or close) to zero. Some image compression techniques exploit this property by encoding each array of quantized coefficients in a "zig-zag" manner so that long runs of trailing zeroes can be encoded together using RLE or other lossless compression techniques. However, each of the N arrays of quantized coefficients 303 includes a respective run of trailing zeroes that would need to be encoded separately under existing image compression techniques.

In some aspects, the inter-channel mapper 330 may map each of the quantized coefficients 303, across all N color channels, to a data structure 304 based on mapping information 332. In some implementations, the mapping information 332 may be trained or otherwise configured to arrange the quantized coefficients 303 in the data structure according to a statistical distribution that is optimized for compression in accordance with one or more encoding techniques (such as RLE). For example, the mapping may arrange the quantized coefficients 303 in order of decreasing (or increasing) amplitude, in the data structure 304, so that the quantized coefficient 303 having the highest amplitude among the N arrays is mapped to the beginning of the data structure 304 and the quantized coefficient 303 having the lowest amplitude among the N arrays is mapped to the end of the data structure 304. As a result of the mapping, quantized coefficients 303 having the same amplitude may be grouped together (or sequentially) in the data structure 304, independent of color channel. In other words, quantized coefficients 303 from different arrays (such as associated with different color channels) may be intermixed within the data structure 304.

The lossless encoder 340 encodes the data structure 304 as one or more codewords 305 associated with a lossless compression scheme. In some implementations, the lossless encoder 340 may encode the data structure 304 according to an entropy coding scheme. As described above, the amplitudes of the quantized coefficients 303 may follow a probabilistic distribution that is skewed towards lower amplitudes (such as zero). As such, entropy encoding techniques can compress the size of the data structure 304 by encoding quantized coefficients 303 having lower amplitudes into shorter codewords 305. In some other implementations, the lossless encoder 340 may encode the data structure 304 according to an RLE scheme. As described above, quantized coefficients 303 having the same amplitude may be grouped together in the data structure 304. As such, RLE encoding techniques can reduce the amount of data required to store or reproduce the data structure 304 by encoding runs of quantized coefficients 303 having the same value (such as zero). Still further, in some implementations, the lossless encoder 340 may implement a combination of lossless compression techniques (such as entropy encoding and RLE).

Figure 4A:
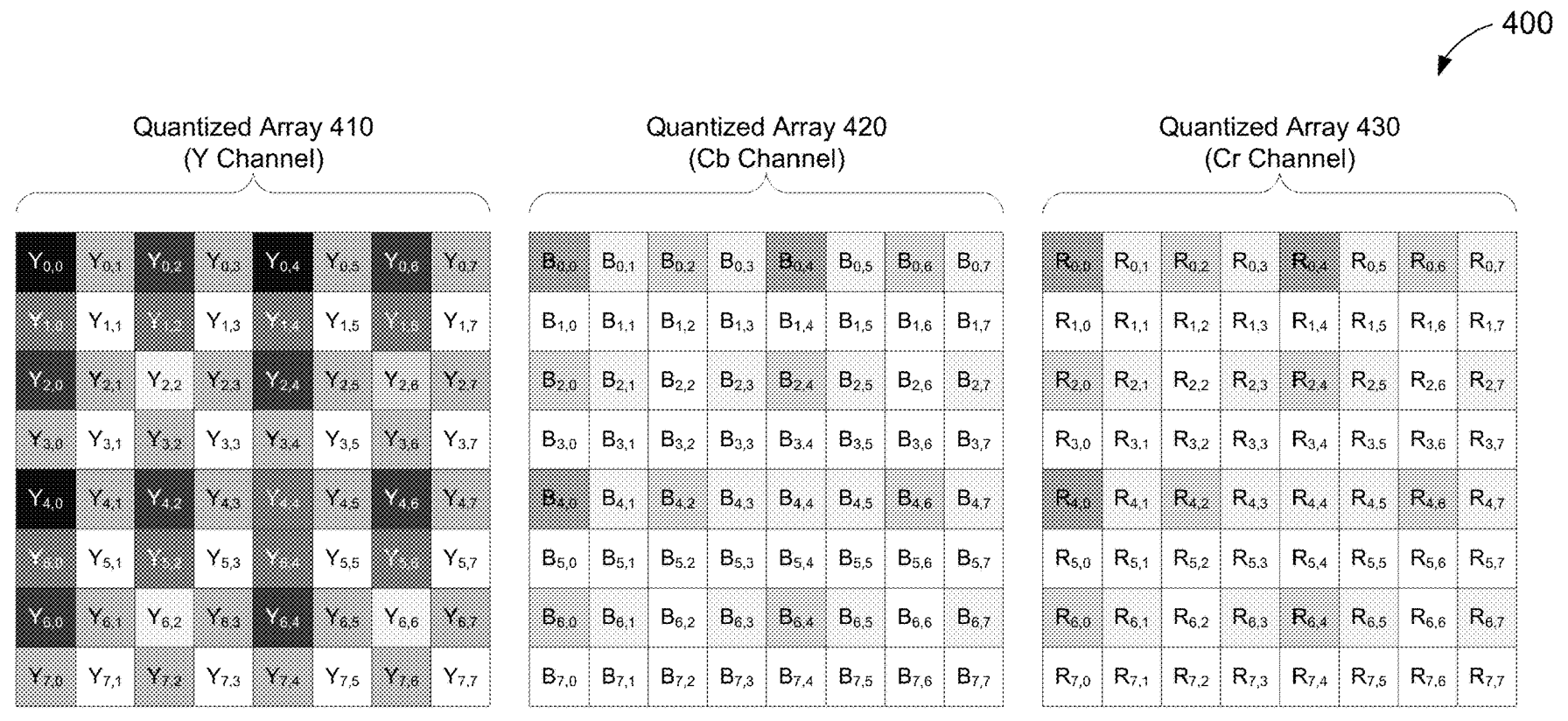

FIG. 4A shows an example block of image data 400 associated with a number of color channels Y, Cb, and Cr. More specifically, the block of image data 400 includes a number of arrays of quantized coefficients 410, 420, and 430 (also referred to herein as "quantized arrays") associated with the channels Y, Cb, and Cr, respectively. In some implementations, the block of image data 400 may be one example of the YCbCr image block 203 or the N arrays of pixel values 301 of FIGS. 2 and 3, respectively. The quantized coefficients in each of the arrays 410-430 are arranged in 8 rows and 8 columns (representing an 8×8 array). More specifically, the first array 410 includes 64 quantized coefficients $Y_{0,0}$-$Y_{7,7}$ each associated with a respective spectral sub-band of the Y channel, the second array 420 includes 64 quantized coefficients $B_{0,0}$-$B_{7,7}$ each associated with a respective spectral sub-band of the Cb channel, and the third array 430 includes 64 quantized coefficients $R_{0,0}$-$R_{7,7}$ each associated with a respective spectral sub-band of the Cr channel.

In the example of FIG. 4A, quantized coefficients having higher amplitudes are depicted as tiles with darker shading whereas quantized coefficients having lower amplitudes are depicted as tiles with lighter shading. As shown in FIG. 4A, quantized coefficients associated with lower-frequency sub-bands (such as $Y_{0,0}$, $B_{0,0}$, and $R_{0,0}$) generally have higher amplitudes than quantized coefficients associated with higher-frequency sub-bands (such as $Y_{7,7}$, $B_{7,7}$, and $R_{7,7}$). Further, the quantized coefficients $Y_{0,0}$-$Y_{7,7}$ associated with the Y channel generally have higher amplitudes than the quantized coefficients $B_{0,0}$-$B_{7,7}$ and $R_{0,0}$-$R_{7,7}$ associated with the Cb and Cr channels, respectively. Existing image processing techniques may encode each of the arrays 410-430 separately, so that codewords associated with the Y channel only encapsulate quantized coefficients $Y_{0,0}$-$Y_{7,7}$ in the first array 410, codewords associated with the Cb channel only encapsulate quantized coefficients $B_{0,0}$-$B_{7,7}$ in the second array 420, and codewords associated with the Cr channel only encapsulate quantized coefficients $R_{0,0}$-$R_{7,7}$ in the third array 430.

Figure 4B:
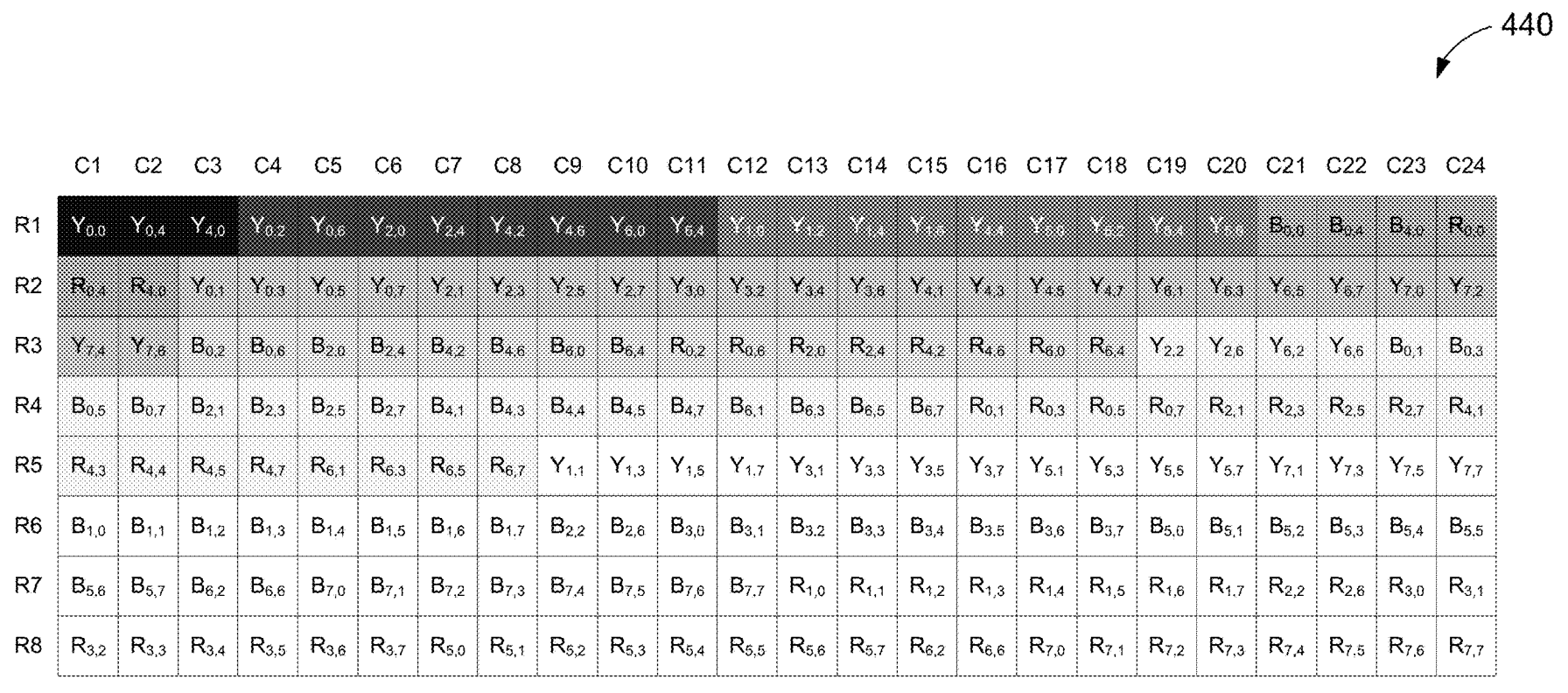

FIG. 4B shows an example mapping of the block of image data depicted in FIG. 4A to a data structure 440, according to some implementations. In some implementations, the data structure 440 may be one example of the data structure 304 of FIG. 3. In the example of FIG. 4B, quantized coefficients in the data structure 440 are shown to be arranged in a number of rows R1-R8 and a number of columns C1-C24. However, in some other implementations, the data structure 440 may include any number of rows and any number of columns. For example, in some implementations, the quantized coefficients can be arranged in a single linear sequence (such as where the data structure 440 includes only a single row of quantized coefficients).

In some aspects, the mapping may arrange the quantized coefficients by order of decreasing amplitude in the data structure 440. In the example of FIG. 4B, the intersection of row R1 and column C1 represents the beginning of the data structure 440, whereas the intersection of row R8 and column C24 represents the end of the data structure 440. Thus, the amplitude of the quantized coefficient ($Y_{0,0}$) mapped to the intersection of row R1 and column C1 of the data structure 440 represents the highest amplitude among the quantized coefficients across all of the arrays 410-430, and the amplitude of the quantized coefficient ($R_{7,7}$) mapped to row R8 and column C24 of the data structure 440 represents the lowest amplitude among the quantized coefficients across all of the arrays 410-430.

Quantized coefficients having the same values are mapped to adjacent locations in the data structure 440. As a result, longer runs of quantized coefficients can be jointly encoded into one or more codewords (compared to existing image processing techniques). For example, the last 88 quantized coefficients in the data structure 440 (such as at the intersections of row R5 and columns C9-C24, row R6 and columns C1-C24, row R7 and columns C1-C24, and row R8 and columns C1-C24) can be encoded as a single run of zeroes. As shown in FIG. 4B, the run of zeroes includes quantized coefficients from each of the arrays 410-430 (across all three color channels Y, Cb, and Cr). Thus, a higher level of compression can be achieved (without any further loss of information) by encoding the data structure 440 as compared to encoding each of the arrays 410-420 separately.

Figure 5:
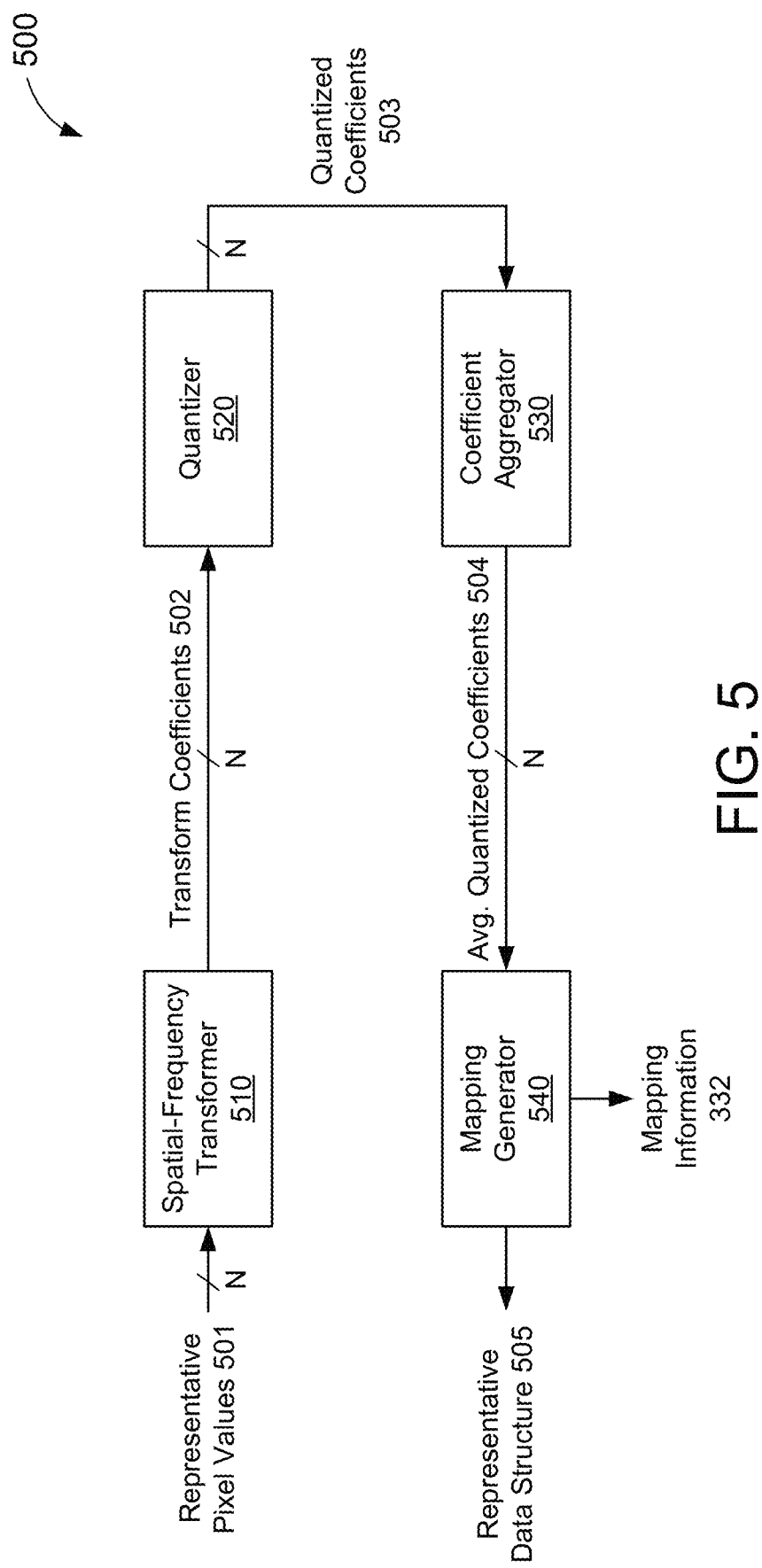
FIG. 5 shows an example system for training an inter-channel mapping of image data to a data structure, according to some implementations.

FIG. 5 shows an example system 500 for training an inter-channel mapping of image data to a data structure, according to some implementations. More specifically, the training system 500 may be configured to generate the mapping information 332 of FIG. 3. In some aspects, the training system 500 may train the mapping information 332 based on a number (N) of arrays of representative pixel values 501 associated with N color channels, respectively (such as the Y, Cb, and Cr channels associated with the YCbCr color space). The N arrays of representative pixel values 501 may represent a block of image data associated with a representative image.

In some implementations, the training system 500 may be integrated with an encoder that uses the mapping information 332 for image compression (such as the image encoder 210 or the image compression system 300 of FIGS. 2 and 3, respectively). In such implementations, the representative image may be included in a set of images received by the encoder (to be encoded or compressed) at runtime. In some other implementations, the training system 500 may be separate from the encoder that uses the mapping information 332 for image compression. In such implementations, the representative image may be included in a set of predetermined images selected for offline training.

The training system 500 includes a spatial-frequency transformer 510, a quantizer 520, a coefficient aggregator 530, and a mapping generator 540. The spatial-frequency transformer 510 transforms the N arrays of representative pixel values 501 to N arrays of transform coefficients 502, respectively. As described with reference to FIG. 3, the spatial-frequency transformer 510 may apply a spatial-frequency transform to each of the N arrays of representative pixel values 501 to convert the pixel values 501 from the spatial domain to the frequency domain. In some implementations, the spatial-frequency transformer 510 may implement the same spatial-frequency transform as the spatial-frequency transformer 310 of FIG. 3. In some other implementations, the training system 500 may leverage the spatial-frequency transformer 310 of FIG. 3 to perform the transformation (in lieu of the spatial-frequency transformer 510).

The quantizer 520 quantizes the N arrays of transform coefficients 502 as N arrays of quantized coefficients 503. As described with reference to FIG. 3, the quantizer 520 may apply a set of quantization values (such as from a quantization codebook) to each of the N arrays of transform coefficients 502 to reduce the amount of data associated with higher-frequency sub-bands. In some implementations, the quantizer 520 may implement the same quantization techniques as the quantizer 320 of FIG. 3. In some other implementations, the training system 500 may leverage the quantizer 320 of FIG. 3 to perform the quantization (in lieu of the quantizer 520).

In some implementations, the coefficient aggregator 530 may aggregate the N arrays of quantized coefficients 503 over multiple image blocks to produce N arrays of average quantized coefficients 504, respectively. More specifically, for each color channel, the coefficient aggregator 530 may calculate a respective array of average quantized coefficients 504 based on the absolute amplitudes of the quantized coefficients 503, associated with the color channel, averaged over multiple image blocks. With reference for example to FIG. 4A, the absolute value of $Y_{0,0}$ can be averaged over multiple image blocks to obtain a respective average quantized coefficient 504 associated with the Y channel. In some implementations, the coefficient aggregator 530 may aggregate the quantize coefficients 503 over multiple image blocks of the same representative image. In some other implementations, the coefficient aggregator 530 may average the quantized coefficients 503 over multiple image blocks from different representative images.

The mapping generator 540 is configured to generate the mapping information 332 based on the average quantized coefficients 504. In some implementations, the mapping generator 540 may map the average quantized coefficients 504 to a representative data structure 505 (similar to the data structure 304 FIG. 3) so that the average quantized coefficients 504 are arranged in order of decreasing (or increasing) amplitude in the representative data structure 505, independent of color channel (such as described with reference to FIG. 4B). The mapping information 332 may indicate how the average quantized coefficients 504 are mapped to the representative data structure 505 so that the mapping can be reproduced at runtime. As a result, an encoder may use the mapping information 332 to map N arrays of quantized coefficients to a data structure and a decoder may use the mapping information 332 to demap the N arrays of quantized coefficients from the data structure.

Figure 6:
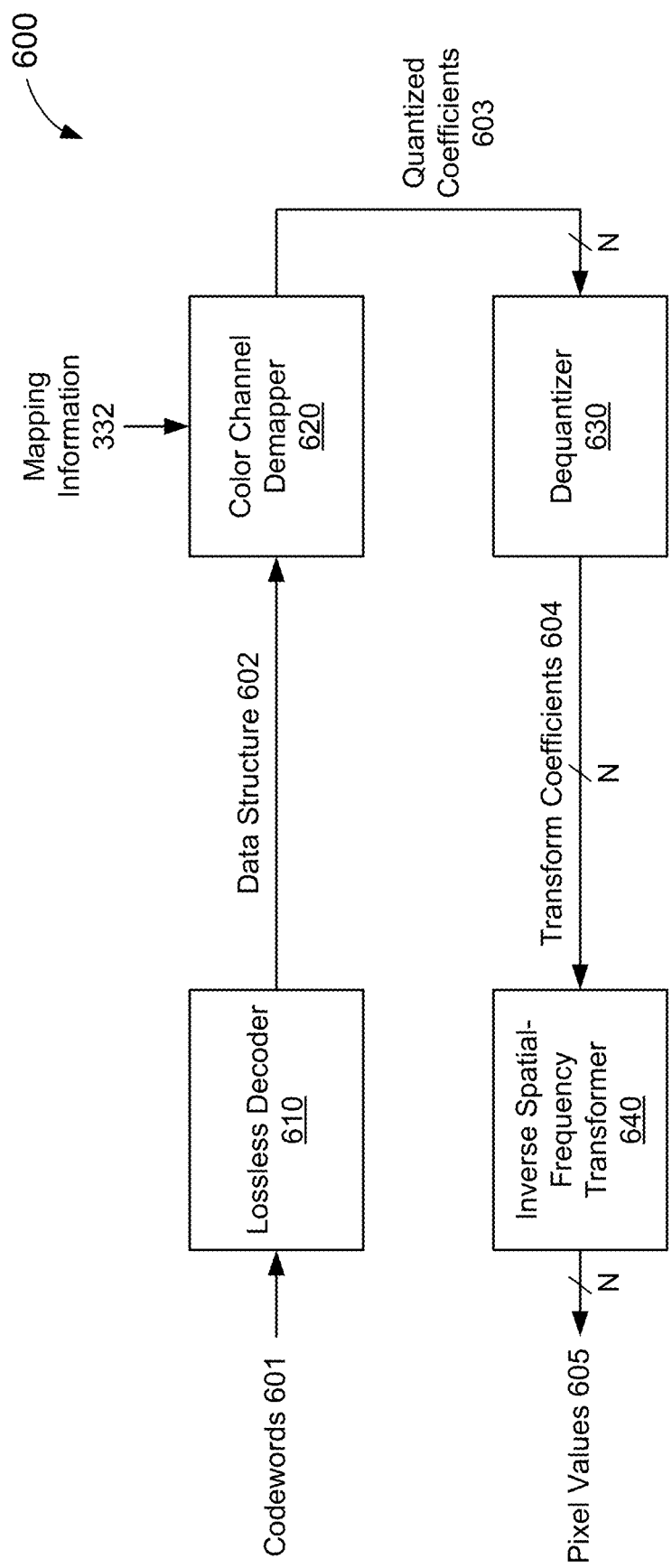
FIG. 6 shows a block diagram of an image decompression system, according to some implementations.

FIG. 6 shows a block diagram of an image decompression system 600, according to some implementations. In some implementations, the image decompression system 600 may be one example of the data decompression component 222 of FIG. 2. Accordingly, the image decompression system 600 may be configured to decode one or more codewords 601 to recover a number (N) of arrays of pixel values 605 associated with N color channels, respectively. More specifically, the image decompression system 600 may reverse the image compression performed by an encoder (such as the data compression component 216 of FIG. 2 or the image compression system 300 of FIG. 3).

The image decompression system 600 includes a lossless decoder 610, a color channel demapper 620, a dequantizer 630, and an inverse spatial-frequency transformer 640. The lossless decoder 610 decodes the codewords 601 as a data structure 602 based on a lossless compression scheme. In some implementations, the lossless decoder 610 may reverse the encoding performed by the lossless encoder 340 of FIG. 3. For example, the lossless decoder 610 may decode the codewords 601 according to an entropy coding scheme, an RLE scheme, or any combination thereof. As described with reference to FIGS. 3 and 4B, the data structure 602 may include a number of quantized coefficients that are arranged, independent of color channel, according to a predetermined mapping.

In some aspects, the color channel demapper 620 may demap N arrays of quantized coefficients 603 from the data structure 602 based on the mapping information 332, where each of the N arrays of quantized coefficients 603 is associated with a respective color channel. In some implementations, the color channel demapper 620 may reverse the mapping performed by the inter-channel mapper 330 of FIG. 3. For example, the color channel demapper 620 may use the same mapping information 332 as the inter-channel mapper 330 to demap the quantized coefficients 603 from the data structure 602. As a result, the color channel demapper 620 may separate the quantized coefficients in the data structure 602 according to color channel.

The dequantizer 630 dequantizes the N arrays of quantized coefficients 603 as N arrays of transform coefficients 604, respectively. In some implementations, the dequantizer 630 may reverse the quantization performed by the quantizer 320 of FIG. 3. For example, the dequantizer 630 may apply the same quantization techniques, as the quantizer 320, to each of the N arrays of quantized coefficients 603. As described with reference to FIG. 3, the N arrays of transform coefficients 604 are frequency-domain representations of the N arrays of pixel values 605, respectively. More specifically, each of the transform coefficients 604 is associated with a respective spectral sub-band based on its location or position in the underlying array.

The inverse spatial-frequency transformer 640 recovers the N arrays of pixel values 605 from the N transform coefficients 604, respectively. In some implementations, the inverse spatial-frequency transformer 640 may reverse the spatial-frequency transformation performed by the spatial-frequency transformer 310 of FIG. 3. For example, the inverse spatial-frequency transformer 640 may apply an inverse of the spatial-frequency transform, implemented by the spatial-frequency transformer 310 (such as an inverse DCT (IDCT) or an inverse wavelet transform), to each of the N arrays of transform coefficients 604. As described with reference to FIG. 3, the N arrays of pixel values 605 may represent a block of image data associated with a given color space (such as the YCbCr color space). Thus, each array of pixel values 605 may be associated with a respective color channel.

Figure 7:
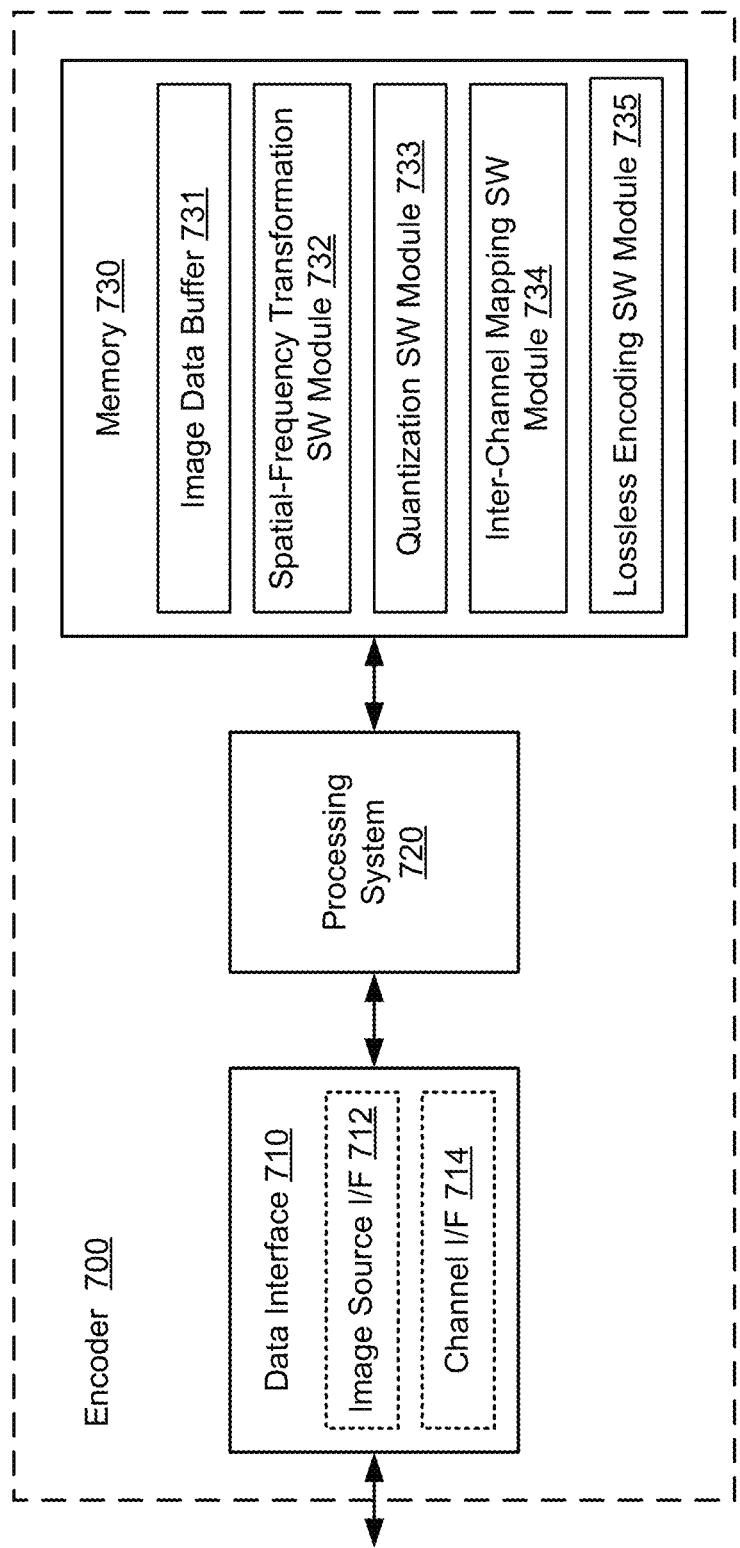
FIG. 7 shows a block diagram of an encoder, according to some implementations.

FIG. 7 shows a block diagram of an encoder 700, according to some implementations. In some implementations, the encoder 700 may be one example of the image encoder 210 of FIG. 2 or the image compression system 300 of FIG. 3. More specifically, the encoder 700 may be configured to encode a block of image data as one or more codewords independent of color channel.

In some implementations, the encoder 700 may include a data interface 710, a processing system 720, and a memory 730. The data interface 710 is configured to receive image data from an image source and output encoded codewords, representing compressed image data, to a channel. In some aspects, the data interface 710 may include an image source interface (I/F) 712 to interface with the image source and a channel interface 714 to interface with the channel. In some implementations, the image source interface 712 may receive a block of pixel data associated with an image, where the block of pixel data includes a plurality of arrays of pixel values associated with a plurality of color channels, respectively.

The memory 730 may include an image data buffer 731 to store the block of pixel data and any intermediate data associated with the encoding operation. The memory 730 also may include a non-transitory computer-readable medium (including one or more nonvolatile memory elements, such as EPROM, EEPROM, Flash memory, a hard drive, and the like) that may store at least the following software (SW) modules:

- a spatial-frequency transformation SW module 732 to transform the plurality of arrays of pixel values to a plurality of arrays of transform coefficients, respectively, based on a spatial-frequency transform;
- a quantization SW module 733 to quantize the plurality of arrays of transform coefficients as a plurality of arrays of quantized coefficients, respectively, based on a quantization codebook;
- an inter-channel mapping SW module 734 to map each quantized coefficient of the plurality of arrays of quantized coefficients to a data structure based on mapping information associated with one or more representative images; and
- a lossless encoding SW module 735 to encode the data structure as one or more codewords associated with a lossless compression scheme.

Each software module includes instructions that, when executed by the processing system 720, causes the encoder 700 to perform the corresponding functions.

The processing system 720 may include any suitable one or more processors capable of executing scripts or instructions of one or more software programs stored in the encoder 700 (such as in memory 730). For example, the processing system 720 may execute the spatial-frequency transformation SW module 732 to transform the plurality of arrays of pixel values to a plurality of arrays of transform coefficients, respectively, based on a spatial-frequency transform. The processing system 720 also may execute the quantization SW module 733 to quantize the plurality of arrays of transform coefficients as a plurality of arrays of quantized coefficients, respectively, based on a quantization codebook. Further, the processing system 720 may execute the inter-channel mapping SW module 734 to map each quantized coefficient of the plurality of arrays of quantized coefficients to a data structure based on mapping information associated with one or more representative images. Still further, the processing system 720 may execute the lossless encoding SW module 735 to encode the data structure as one or more codewords associated with a lossless compression scheme.

Figure 8:
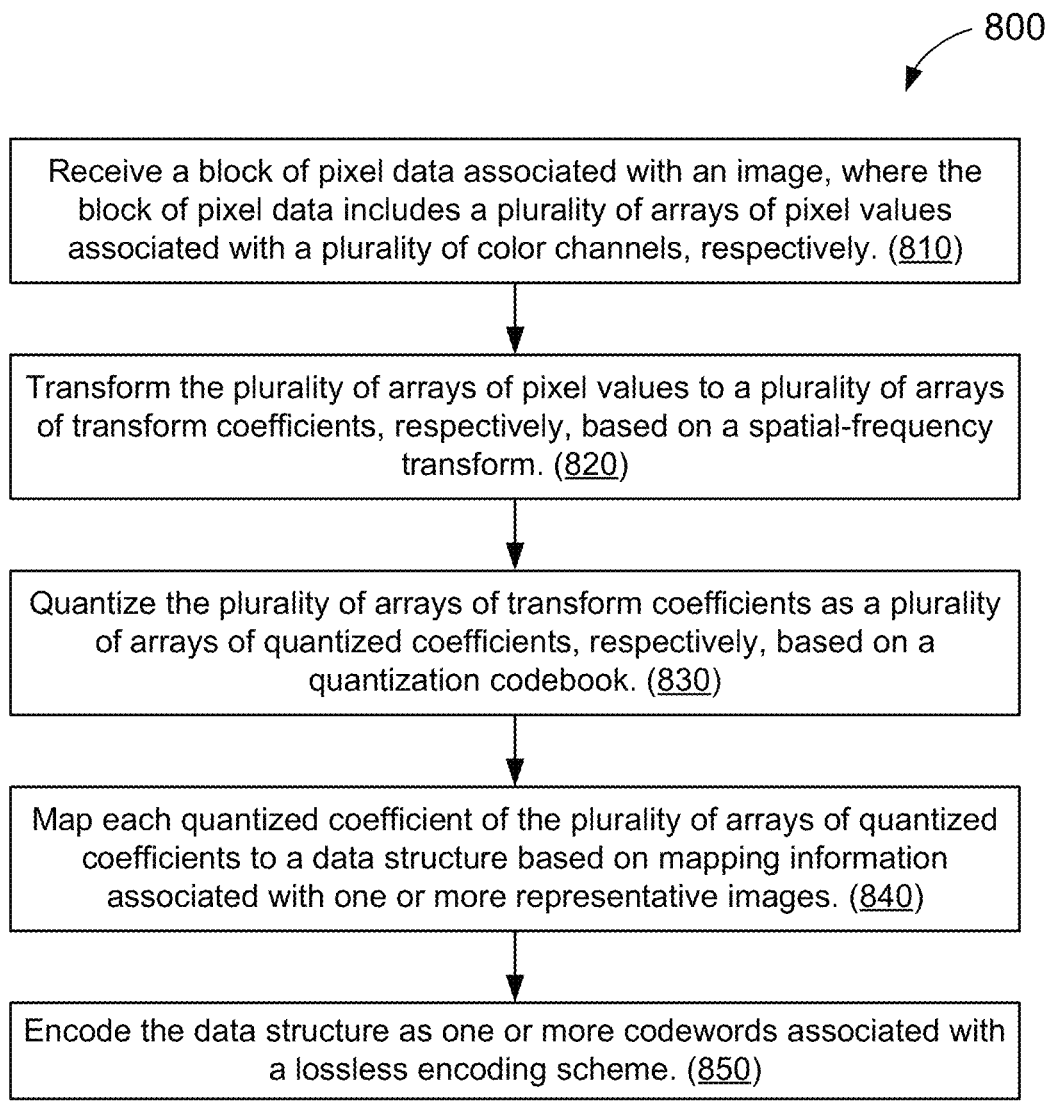
FIG. 8 shows an illustrative flowchart depicting an example operation for image encoding, according to some implementations.

FIG. 8 shows an illustrative flowchart depicting an example operation 800 for image encoding, according to some implementations. In some implementations, the example operation 800 may be performed by an encoder such as the image encoder 210 of FIG. 2 or the image compression system 300 of FIG. 3.

The encoder receives a block of pixel data associated with an image, the block of pixel data including a plurality of arrays of pixel values associated with a plurality of color channels, respectively (810). In some aspects, the plurality of color channels may include Y, Cb, and Cr channels. The encoder transforms the plurality of arrays of pixel values to a plurality of arrays of transform coefficients, respectively, based on a spatial-frequency transform (820). In some aspects, the spatial-frequency transform may be a DCT or a wavelet transform. The encoder also quantizes the plurality of arrays of transform coefficients as a plurality of arrays of quantized coefficients, respectively, based on a quantization codebook (830). The encoder maps each quantized coefficient of the plurality of arrays of quantized coefficients to a data structure based on mapping information associated with one or more representative images (840). The encoder further encodes the data structure as one or more codewords associated with a lossless encoding scheme (850). In some aspects, the encoder may further transmit the mapping information and the one or more codewords to a decoder.

In some aspects, the encoder may further receive a first block of pixel data associated with the one or more representative images, where the first block of pixel data includes a plurality of arrays of first pixel values associated with the plurality of color channels, respectively; transform the plurality of arrays of first pixel values to a plurality of arrays of first transform coefficients, respectively, based on the spatial-frequency transform; quantize the plurality of arrays of first transform coefficients as a plurality of arrays of first quantized coefficients, respectively, based on the quantization codebook; and generate the mapping information based at least in part on the plurality of arrays of first quantized coefficients.

In some implementations, the generating of the mapping information may include mapping each first quantized coefficient of the plurality of arrays of first quantized coefficients, in order of decreasing amplitude, to a representative data structure so that the first quantized coefficient having the highest amplitude among the plurality of arrays of first quantized coefficients is mapped to the beginning of the representative data structure and the first quantized coefficient having the lowest amplitude among the plurality of arrays of first quantized coefficients is mapped to the end of the ordered sequence, where the mapping information is associated with the mapping of the first quantized coefficients to the representative data structure.

In some aspects, the encoder may further receive a second block of pixel data including a plurality of arrays of second pixel values associated with the plurality of color channels, respectively; transform the plurality of arrays of second pixel values to a plurality of arrays of second transform coefficients, respectively, based on the spatial-frequency transform; quantize the plurality of arrays of second transform coefficients as a plurality of arrays of second quantized coefficients, respectively, based on a quantization codebook; and average each first quantized coefficient of the plurality of arrays of first quantized coefficients with a respective second quantized coefficient of the plurality of arrays of second coefficients, where the mapping information is generated based on the averages of the first and second quantized coefficients.

In some implementations, the first block of pixel data and the second block of pixel data may be associated with the same representative image of the one or more representative images. In some implementations, the first block of pixel data and the second block of pixel data may be associated with different representative images of the one or more representative images.

Figure 9:
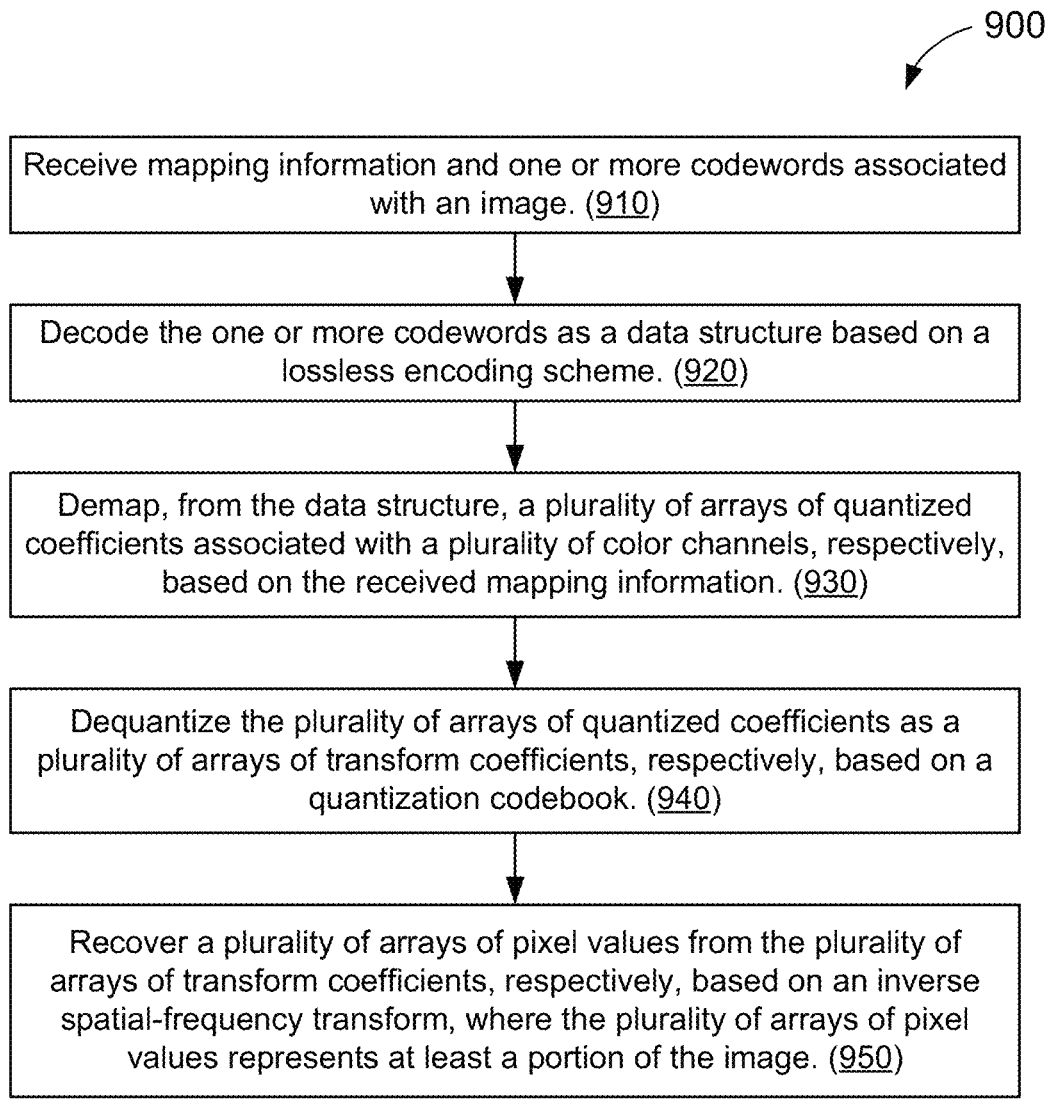
FIG. 9 shows an illustrative flowchart depicting an example operation for image decoding, according to some implementations.

FIG. 9 shows an illustrative flowchart depicting an example operation 900 for image decoding, according to some implementations. In some implementations, the example operation 900 may be performed by a decoder such as the image decoder 220 of FIG. 2 or the image decompression system 600 of FIG. 6.

The decoder receives mapping information and one or more codewords associated with an image (910). The decoder decodes the one or more codewords as a data structure based on a lossless coding scheme (920). The decoder demaps, from the data structure, a plurality of arrays of quantized coefficients associated with a plurality of color channels, respectively, based on the received mapping information (930). In some aspects, the plurality of color channels may include Y, Cb, and Cr channels. The decoder dequantizes the plurality of arrays of quantized coefficients as a plurality of arrays of transform coefficients, respectively, based on a quantization codebook (940). The decoder further recovers a plurality of arrays of pixel values from the plurality of arrays of transform coefficients, respectively, based on an inverse spatial-frequency transform, where the plurality of arrays of pixel values represents at least a portion of the image (950). In some aspects, the spatial-frequency transform may be an IDCT or a wavelet transform.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of image compression, comprising:
receiving a block of pixel data associated with an image, the block of pixel data including a plurality of arrays of pixel values including at least a first array of pixel values and a second array of pixel values, the first array of pixel values associated with a first color channel of a plurality of color channels, and the second array of pixel values associated with a second color channel of the plurality of color channels different than the first color channel;
transforming each array of pixel values of the plurality of arrays of pixel values into a respective array of transform coefficients based on a spatial-frequency transform;
quantizing each of the arrays of transform coefficients as a respective array of quantized coefficients based on a quantization codebook;
pooling each quantized coefficient of the arrays of quantized coefficients into a single linear sequence of coefficients based on mapping information associated with one or more representative images, the quantized coefficients arranged in the linear sequence in order of decreasing amplitude, independent of the plurality of color channels, so that the quantized coefficient having the highest amplitude among the plurality of color channels is first in the linear sequence and the quantized coefficient having the lowest amplitude among the plurality of color channels is last in the linear sequence; and
encoding the linear sequence into codewords associated with a lossless compression scheme.

2. The method of claim 1, wherein the first color channel comprises at least one of a luma (Y) channel, a blue-difference chroma (Cb) channel, or a red-difference chroma (Cr) channel, and wherein the second color channel comprises a different one of the at least Y channel, Cb channel, or Cr channel.

3. The method of claim 1, wherein the spatial-frequency transform comprises a discrete cosine transform (DCT) or a wavelet transform.

4. The method of claim 1, further comprising:
receiving a first block of pixel data associated with the one or more representative images, the first block of pixel data including a plurality of arrays of first pixel values associated with the plurality of color channels, respectively;
transforming the plurality of arrays of first pixel values to a plurality of arrays of first transform coefficients, respectively, based on the spatial-frequency transform;
quantizing the plurality of arrays of first transform coefficients as a plurality of arrays of first quantized coefficients, respectively, based on the quantization codebook; and
generating the mapping information based at least in part on the plurality of arrays of first quantized coefficients.

5. The method of claim 4, further comprising:
receiving a second block of pixel data including a plurality of arrays of second pixel values associated with the plurality of color channels, respectively;
transforming the plurality of arrays of second pixel values to a plurality of arrays of second transform coefficients, respectively, based on the spatial-frequency transform;
quantizing the plurality of arrays of second transform coefficients as a plurality of arrays of second quantized coefficients, respectively, based on a quantization codebook; and
averaging each first quantized coefficient of the plurality of arrays of first quantized coefficients with a respective second quantized coefficient of the plurality of arrays of second coefficients, the mapping information being generated based on the averages of the first and second quantized coefficients.

6. The method of claim 5, wherein the first block of pixel data and the second block of pixel data are associated with the same representative image of the one or more representative images.

7. The method of claim 5, wherein the first block of pixel data and the second block of pixel data are associated with different representative images of the one or more representative images.

8. The method of claim 1, further comprising:
transmitting the mapping information and the one or more codewords to a decoder.

9. The method of claim 1, wherein a run of zeroes at the end of the linear sequence includes a first set of quantized coefficients from the first array of pixel values associated with the first color channel and a second set of quantized coefficients from the second array of pixel values associated with the second color channel, and wherein encoding the linear sequence includes jointly encoding the first set of quantized coefficients and the second set of quantized coefficients within the codewords.

10. An encoder comprising:
a processing system; and
a memory storing instructions that, when executed by the processing system, causes the encoder to:
receive a block of pixel data associated with an image, the block of pixel data including a plurality of arrays of pixel values including at least a first array of pixel values and a second array of pixel values, the first array of pixel values associated with a first color channel of a plurality of color channels, and the second array of pixel values associated with a second color channel of the plurality of color channels different than the first color channel;
transform each array of pixel values of the plurality of arrays of pixel values into a respective array of transform coefficients based on a spatial-frequency transform;
quantize each of the arrays of transform coefficients as a respective array of quantized coefficients based on a quantization codebook;
pool each quantized coefficient of the arrays of quantized coefficients into a single linear sequence of coefficients based on mapping information associated with one or more representative images, the quantized coefficients arranged in the linear sequence in order of decreasing amplitude, independent of the plurality of color channels, so that the quantized coefficient having the highest amplitude among the plurality of color channels is first in the linear sequence and the quantized coefficient having the lowest amplitude among the plurality of color channels is last in the linear sequence; and
encode the linear sequence into codewords associated with a lossless compression scheme.

11. The encoder of claim 10, wherein the first color channel comprises at least one of a luma (Y) channel, a blue-difference chroma (Cb) channel, or a red-difference chroma (Cr) channel, and wherein the second color channel comprises a different one of the at least Y channel, Cb channel, or Cr channel.

12. The encoder of claim 10, wherein the spatial-frequency transform comprises a discrete cosine transform (DCT) or a wavelet transform.

13. The encoder of claim 10, wherein execution of the instructions further causes the encoder to:
receive a first block of pixel data associated with the one or more representative images, the first block of pixel data including a plurality of arrays of first pixel values associated with the plurality of color channels, respectively;
transform the plurality of arrays of first pixel values to a plurality of arrays of first transform coefficients, respectively, based on the spatial-frequency transform;
quantize the plurality of arrays of first transform coefficients as a plurality of arrays of first quantized coefficients, respectively, based on the quantization codebook; and
generate the mapping information based at least in part on the plurality of arrays of first quantized coefficients.

14. The encoder of claim 13, wherein execution of the instructions further causes the encoder to:
receive a second block of pixel data including a plurality of arrays of second pixel values associated with the plurality of color channels, respectively;
transform the plurality of arrays of second pixel values to a plurality of arrays of second transform coefficients, respectively, based on the spatial-frequency transform;
quantize the plurality of arrays of second transform coefficients as a plurality of arrays of second quantized coefficients, respectively, based on a quantization codebook; and
average each first quantized coefficient of the plurality of arrays of first quantized coefficients with a respective second quantized coefficient of the plurality of arrays of second coefficients, the mapping information being generated based on the averages of the first and second quantized coefficients.

15. The encoder of claim 14, wherein the first block of pixel data and the second block of pixel data are associated with the same representative image of the one or more representative images.

16. The encoder of claim 14, wherein the first block of pixel data and the second block of pixel data are associated with different representative images of the one or more representative images.

17. The encoder of claim 10, wherein a run of zeroes at the end of the linear sequence includes a first set of quantized coefficients from the first array of pixel values associated with the first color channel and a second set of quantized coefficients from the second array of pixel values associated with the second color channel, and wherein encoding the linear sequence includes jointly encoding the first set of quantized coefficients and the second set of quantized coefficients within the codewords.

18. A method of image decompression, comprising:
- receiving mapping information and one or more codewords associated with an image;
- decoding the one or more codewords as a single linear sequence of coefficients based on a lossless compression scheme, the coefficients arranged in the linear sequence in order of decreasing amplitude, independent of a plurality of color channels, so that the coefficient having the highest amplitude among the plurality of color channels is first in the linear sequence;
- demapping, from the linear sequence, a plurality of arrays of quantized coefficients associated with the plurality of color channels, respectively, based on the received mapping information, the demapped arrays of quantized coefficients arranging the quantized coefficients according to color channel, and the quantized coefficient having the lowest amplitude among the plurality of color channels being last in the linear sequence;
- dequantizing the plurality of arrays of quantized coefficients as a plurality of arrays of transform coefficients, respectively, based on a quantization codebook; and
- recovering, for each respective color channel of the plurality of color channels, at least one array of pixel values from the plurality of arrays of transform coefficients associated with the respective color channel based on an inverse spatial-frequency transform, each of the arrays of pixel values representing at least a portion of the image.

19. The method of claim 18, wherein a first color channel of the plurality of color channels comprises at least one of a luma (Y) channel, a blue-difference chroma (Cb) channel, or a red-difference chroma (Cr) channel, and wherein a second color channel of the plurality of color channels comprises a different one of the at least Y channel, Cb channel, or Cr channel.

20. The method of claim 18, wherein the inverse spatial-frequency transform comprises an inverse discrete cosine transform (IDCT) or an inverse wavelet transform.

\* \* \* \* \*